United States Statutory Invention Registration [19]

[11] Reg. Number: H396

Spry [43] Published: Jan. 5, 1988

[54] PRISM HOLDER

[75] Inventor: Robert J. Spry, Tipp City, Ohio

[73] Assignee: The United States of America as represented by the Secretary of the Air Force, Washington, D.C.

[21] Appl. No.: 747,743

[22] Filed: Jun. 24, 1985

[51] Int. Cl.[4] ..... G02B 7/18

[52] U.S. Cl. ..... 350/287

[58] Field of Search ..... 350/287

[56] References Cited

U.S. PATENT DOCUMENTS

| | | | |
|---|---|---|---|
| 2,216,031 | 9/1940 | Bennett | 88/1 |
| 2,780,142 | 2/1957 | Bouwers | 83/57 |
| 3,016,798 | 6/1962 | Lawrence | 350/276 SLA |
| 3,039,349 | 6/1962 | Rodgers | 350/276 SLA |
| 3,433,219 | 3/1969 | Genevay | 128/76.5 |
| 3,596,863 | 8/1971 | Kaspareck | 350/287 |
| 3,788,733 | 1/1974 | Breglia et al. | 350/287 |
| 3,953,113 | 4/1976 | Shull | 350/288 |
| 4,381,884 | 5/1983 | Houle | 350/287 |

*Primary Examiner*—Stephen C. Buczinski
*Assistant Examiner*—Linda J. Wallace
*Attorney, Agent, or Firm*—Bobby D. Scearce; Donald J. Singer

[57] ABSTRACT

A novel device for holding an optical prism in a preselected orientation is described which comprises a base having a substantially flat first surface thereon and first and second upstanding side members attached thereto with the first surface therebetween, the side members defining respective substantially parallel confronting second and third surfaces, each substantially perpendicular to the first surface, for mounting an optical prism therebetween, a shoulder of preselected height and width on the first surface adjacent the second surface for supporting the prism in spaced relationship to the first surface, a tapped hole through the second member and substantially perpendicular to the third surface, and a set screw received by the tapped hole for holding the prism in a preselected orientation between the second and third surfaces. The base may include a peripheral flange for mounting the device.

5 Claims, 4 Drawing Figures

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

PRISM HOLDER

RIGHTS OF THE GOVERNMENT

The invention described herein may be manufactured and used by or for the Government of the United States for all governmental purposes without the payment of any royalty.

BACKGROUND OF THE INVENTION

The present invention relates generally to precision mounting devices for optical components, and more particularly to a novel holder for supporting a prism within an optical system, especially within an optical train used for projecting a laser beam.

The present invention comprises a prism holder of particular use in supporting a total internal reflecting right angle prism within an optical train for projecting a laser beam and bending the beam through 90°. The prism holder of the present invention is characterized by numerous advantages over devices known in the art: the holder is easily fabricated at low cost compared to existing devices; the structure of the holder includes a safety backstop spaced a predetermined distance from the internally reflective surface of the supported prism to absorb extraneous light which may leak through the reflective surface of the prism; the structure of the holder permits bending of laser beams through a 90° angle lying in a plane other than one parallel to the (usually horizontal) laser generating table, and permits rotation of the plane of incident and reflected laser beams through a large angle relative to the plane of the laser table; the holder of the invention also provides retrofit means to mount prisms within certain commercially available lens and mirror holders.

It is, therefore, a principal object of the invention to provide an improved optical prism holder.

It is a further object of the invention to provide a novel prism holder for supporting a prism within an optical train used for projecting a laser beam.

These and other objects of the present invention will become apparent as the detailed description of certain representative embodiments thereof proceeds.

SUMMARY OF THE INVENTION

In accordance with the foregoing principles and objects of the present invention, a novel device for holding an optical prism in a preselected orientation is described which comprises a base having a substantially flat first surface thereon and first and second upstanding side members attached thereto with the first surface therebetween, the side members defining respective substantially parallel confronting second and third surfaces, each substantially perpendicular to the first surface, for mounting an optical prism therebetween, a shoulder of preselected height and width on the first surface adjacent the second surface for supporting the prism in spaced relationship to the first surface, a tapped hole through the second member and substantially perpendicular to the third surface, and a set screw received by the tapped hole for holding the prism in a preselected orientation between the second and third surfaces. The base may include a peripheral flange for mounting the device.

DESCRIPTION OF THE DRAWINGS

The present invention will be more clearly understood from the following detailed description of representative embodiments thereof read in conjunction with the accompanying drawings wherein.

DETAILED DESCRIPTION

Figure 1:
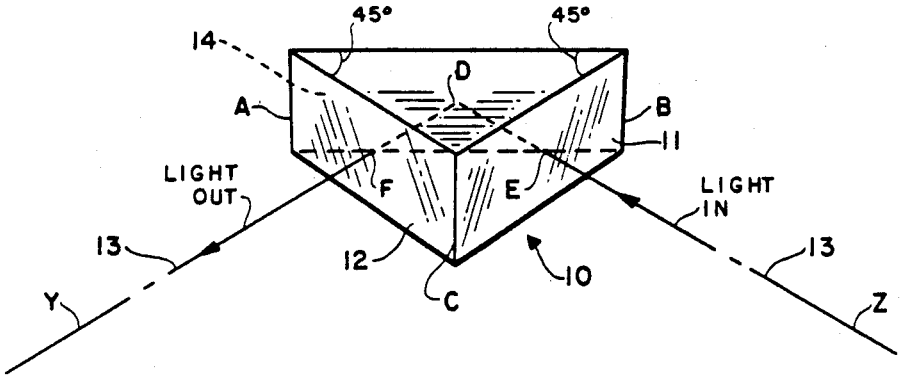
FIG. 1 is a perspective drawing of an internally reflecting right angle prism.

Referring first to FIG. 1, shown therein is an internally reflecting right angle prism 10, with legend to illustrate the operation thereof. For the purpose of illustration, prism 10 is shown as generally triangular in shape characterized by a cross section (in a YZ plane) defining a 45° right triangle; prism 10 has two perpendicular surfaces 11,12 for receiving and transmitting a light beam 13, and a reflective surface 14 for internally reflecting beam 13 along a path indicated by "light in" and "light out". In the use of prism 10, beam 13 may be directed through (and preferably substantially perpendicular to) surface 11 such as at point E; beam 13 is then substantially totally reflected at a corresponding point D lying in the plane defining surface 14, and exits at a corresponding point F lying in the plane defining surface 12. Material of construction for prism 10 is preferably selected so that angle EDC (where C represents the line of intersection of the planes defining surfaces 11,12), which angle for prism 10 illustrated in FIG. 1 is 45°, is greater than the critical angle for the prism material. For example, the critical angle at a wavelength of 5500 angstroms for fused silica (having a refractive index D equal to 1.460) is 43.23 degrees. An evanescent wave may to some degree penetrate surface 14 at D into the space beyond surface 14, but transfers no substantial amount of energy across the surface unless there is dust, film or other foreign matter or imperfections on the reflecting surface, or unless prism 10 is in contact with other material abutting prism 10 at surface 14.

Figure 2:
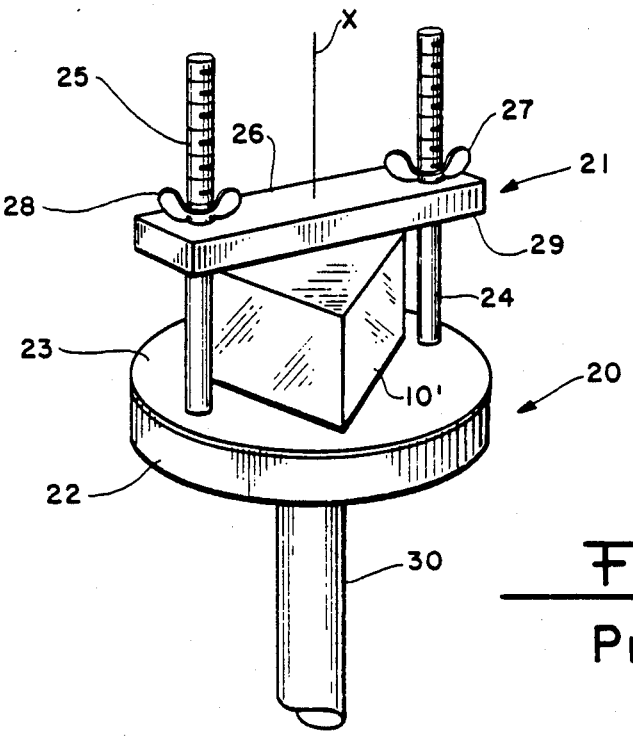
Fig. 2 Prior Art
FIG. 2 is a perspective drawing of a representative prior art uniaxial prism table usable for holding the prism of FIG. 1.

Referring now to FIG. 2, shown therein is a commercially available uniaxial prism table 20 having clamping means 21 usable for holding a prism such as that illustrated in FIG. 1. Prism table 20 typically comprises a table element 22 defining a substantially flat surface 23 for supporting a prism 10'. A pair of upright threaded rods 24,25 are rigidly connected to table element 22 substantially as shown in FIG. 2, and receive a clamping plate 26 and a pair of wing nuts 27,28 for clamping prism 10' on surface 23 generally between rods 24,25. The under surface of clamping plate 26 may preferably include a cushioning layer 29 of felt or the like for resiliently contacting prism 10'. Table element 22 may be supported in any convenient manner on a post 30 or the like, which provides means for positioning prism table 20 within an optical train. Commercially available units such as that shown as table 20 in FIG. 2 are relatively inexpensive, but have only one rotational axis (X) for alignment of laser beams. Alternatively, table element 22 may, in certain relatively more expensive commercially available triaxial prism tables, be supported on a set (usually three) of adjustable screw type pads (not shown) for selectively tilting table element 22 about two perpendicular horizontal axes. These devices may provide stable high resolution angular adjustment of the prism supporting surface of the prism table, but may be adjustable within only about ±3° of tilt about each horizontal axis and about ±5° of rotation about the vertical axis (X).

Figure 3:
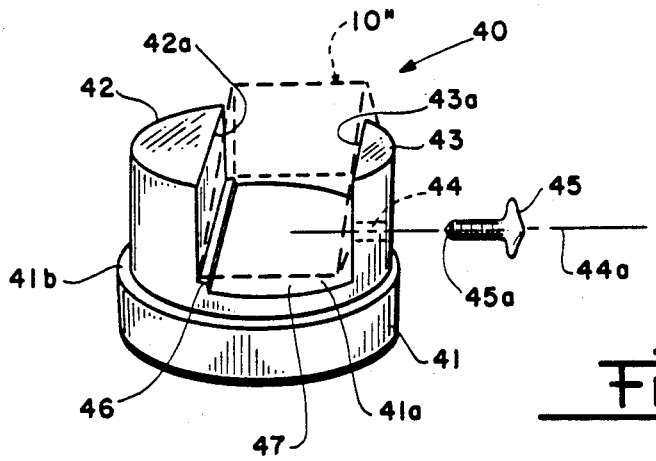
FIG. 3 is a perspective drawing of the novel prism holder of the present invention.

FIG. 3 presents a perspective drawing of the novel prism holder 40 of the present invention. Holder 40 comprises a base 41 supporting two upstanding side members 42,43 having respective confronting parallel surfaces 42*a*, 43*a*, each substantially perpendicular to and defining therebetween a surface 41*a* on base 41. Surface 41*a* may preferably be machined, coated, textured or otherwise treated to be light absorbent or diffusely reflective; methods or materials well known in the art may be used to impart the desirable attributes to surface 41*a*. A peripheral or annular shoulder defining a flange 41*b* of predetermined dimensions may be included on base 41 substantially as shown in order to provide means to secure holder 40 within a mirror holder in an application of holder 40 as hereinafter described in relation to FIG. 4. A tapped hole 44 extends through side member 43 and intersects surface 43*a*, the centerline 44*a* of hole 44 being preferably substantially perpendicular to surface 43*a*. A wing screw 45, set screw or the like is received by tapped hole 44 and is sized to project into the space defined between surfaces 42*a*,43*a* when substantially threaded into tapped hole 44. Screw 45 may, as hereinafter described, include a tip 45*a* of plastic, rubber, or other soft resilient material. A shoulder 46 of preselected height and width is defined on surface 41*a* adjacent surface 42*a* and extends substantially the length of side member 42, as illustrated in FIG. 3.

A prism 10″ (shown in broken lines and which may be similar to the type shown in FIG. 1) may be mounted between surfaces 42*a*,43*a* in spaced relationship to surface 41*a*. One triangular surface of prism 10″ is positioned in substantial contact with surface 42*a*. The bottom of prism 10″ (i.e., that surface corresponding to surface 14 of prism 10 illustrated in FIG. 1) is placed atop shoulder 46; prism 10″ is then clamped between side members 42,43 by tightening screw 45 against the triangular surface of prism 10″ adjacent side member 43, and is thereby held in spaced relationship to surface 41*a* and in a preselected orientation between surfaces 42*a*,43*a*; the size of the spacing between prism 10″ and surface 41*a* is therefore defined by the predetermined height of shoulder 46. Resilient tip 45*a* on screw 45 is intended to prevent surface damage to prism 10″ in the clamped condition.

In a unit built in demonstration of the invention herein, prism holder 40 was sized to include a base 41 portion approximately 1.75 inches in diameter and sides 42,43 approximately 0.75 inch in length; shoulder 46 was selected to be about 1/16×1/16 inch. These dimensions were selected so that prism holder 40 could be conveniently received in a commercially available lens holder, although the size of holder 40 is not considered limiting of the invention herein. The material selected for the demonstration unit was aluminum, and the surfaces were black anodized, although it is recognized that other materials may be selected within the scope of these teachings. Accordingly, conventional fabrication techniques, such as machining, may be utilized to produce holder 40. Because the surface of prism 10″ which includes the internally reflective surface is held in spaced relationship to surface 41*a* of base 41, an air space 47 of predetermined thickness (1/16 inch in the demonstration unit) is defined between prism 10″ and surface 41*a*. Surface 41*a* may therefore function as a backstop to absorb extraneous light escaping through the internally reflecting surface of prism 10″, while air space 47 may effectively prevent coupling of an evanescent wave (such as might characterize beam 13 shown in FIG. 1) reflected back into prism 10″.

Figure 4:
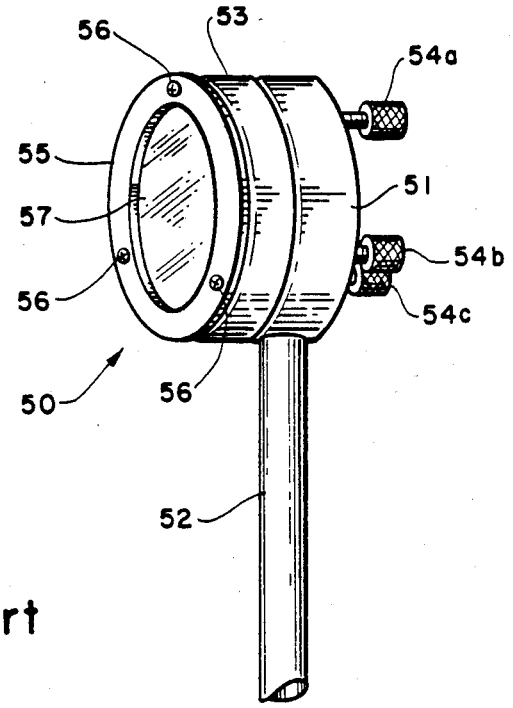
Fig. 4 Prior Art
FIG. 4 is a perspective drawing of a prior art mirror holder of a type to which the prism holder of FIG. 3 may be adapted.

Prism holder 40 of the present invention may be held within an optical train using any convenient means. FIG. 4 illustrates a conventional mirror holder of a type to which holder 40 may be adapted within such an optical train. Mirror holder 50 of FIG. 4 conventionally consists of a base 51 supported by a post 52 similar in function to post 30 of the prism table of FIG. 2. A faceplate 53 of size corresponding to that of base 51 is resiliently held to base 51 by a spring (not shown) disposed axially of base 51. Three adjusting screws 54*a,b,c*, disposed through axial holes (also not shown) through base 51 contact faceplate 53 and thereby provide three-point adjustment of faceplate 53 relative to base 51. A flange 55 is attached to faceplate 53 through one or more screws 56, and holds a mirror 57 in place, substantially as shown in FIG. 4. In order to adapt prism holder 40 of the present invention to use within mirror holder 50 of FIG. 4, flange 55 is removed, and mirror 57 replaced by holder 40 by placing base 41 within faceplate 53, and reinstalling flange 55 against flange 41*b* whereby sides 42,43 project through the central opening defined by flange 55. The assembly of prism holder 40 with mirror holder 50 therefore provides numerous degrees of freedom for the positioning of a prism held within prism holder 40. Accordingly, prism 10″ (see FIG. 3) may be positioned within prism holder 40 in any preselected orientation relative to a set of axes corresponding to the X,Y,Z axes of FIGS. 1 and 2, and, further, prism holder 40 as installed in mirror holder 50 as described may be adjusted in position about or along post 52 and tilted about three orthogonal axes relative to base 51 by suitably adjusting screws 54*a,b,c*. It is clear that the prism holder of the present invention may find substantial use in conjunction with other positioning and holding devices for optical components, as would occur to one with skill in the field of the invention.

The present invention, as hereinabove described, therefore provides a novel prism holder for use in an optical train for transmitting an optical beam. The prism holder of the invention is characterized by simple design and ease and economy of fabrication. It is understood that certain modifications to the invention as described may be made, as might occur to one with skill in the field of this invention, within the scope of the appended claims. Therefore, all embodiments contemplated hereunder which achieve the objects of the invention have not been shown in complete detail. Other embodiments may be developed without departing from the spirit of the invention or from the scope of the appended claims.

I claim:

1. A device for holding in preselected orientation an optical prism having an internally reflective surface, comprising:

a. a base having a substantially flat first surface thereon;

b. first and second upstanding side members on said base at opposite edges of said first surface and defining said first surface therebetween, said side members further defining respective substantially flat and parallel confronting second and third surfaces defining an opening therebetween of preselected width for receiving said optical prism, each of said second and third surfaces being substantially perpendicular to said first surface;

c. a shoulder of preselected height and width on said first surface adjacent said first upstanding member and said second surface for supporting said prism thereon with said reflective surface in spaced relationship to said first surface, the height of said shoulder preselected to define a space between said reflective surface of said prism and said first surface to prevent optical coupling of evanescent waves between said first surface and said prism;

d. a tapped hole through said second member and intersecting said third surface, the centerline of said tapped hole being substantially perpendicular to said third surface; and e. a set screw, received by said tapped hole, for holding said prism in preselected orientation between said second and third surfaces.

2. The device as recited in claim 1 wherein said first surface is substantially optically absorbent.

3. The device as recited in claim 1 wherein said first surface is diffusely reflective.

4. The device as recited in claim 1 further comprising a peripheral flange on said base.

5. The device as recited in claim 1 further comprising a resilient tip on said set screw.

* * * * *